R. N. EGGLESTON.
BUTTER MERGING MACHINE.
APPLICATION FILED FEB. 2, 1918.
1,279,306.
Patented Sept. 17, 1918.
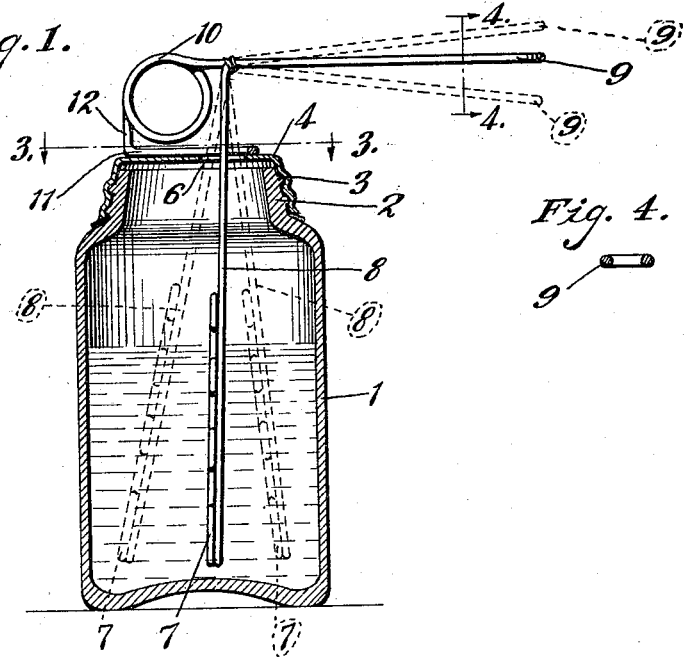
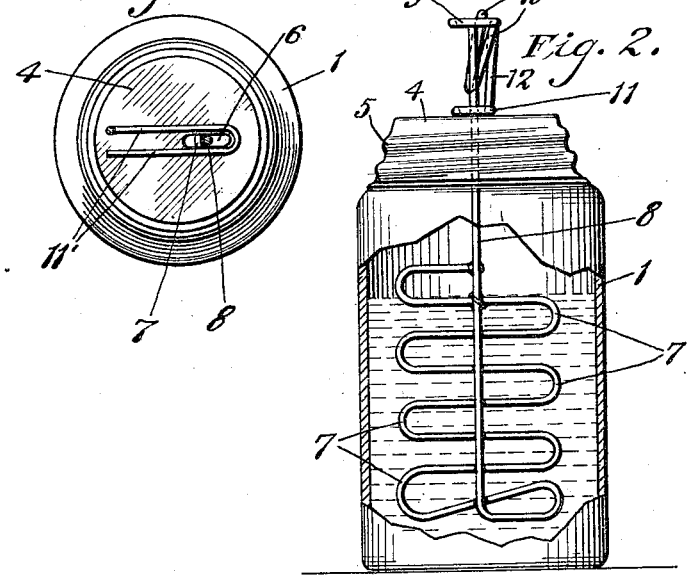
Inventor:
Robert N. Eggleston
By Ralph Rauh
Atty.

UNITED STATES PATENT OFFICE.

ROBERT N. EGGLESTON, OF ST. LOUIS, MISSOURI, ASSIGNOR TO SYNDICATE SALES COMPANY, OF ST. LOUIS, MISSOURI, A CORPORATION OF MISSOURI.

BUTTER-MERGING MACHINE.

1,279,306.  Specification of Letters Patent.  Patented Sept. 17, 1918.

Application filed February 2, 1918. Serial No. 215,083.

*To all whom it may concern:*

Be it known that I, ROBERT N. EGGLESTON, a citizen of the United States, residing at the city of St. Louis, State of Missouri, have invented a certain new and useful Improvement in Butter-Merging Machines, of which the following is a specification, reference being had to the accompanying drawings, forming a part thereof.

This invention relates to a certain new and useful improvement in butter-merging machines.

Under present living conditions, it is becoming generally increasingly necessary to practise economies; and among such economies, it has been found that a merging of butter and milk will produce a compound having substantially the consistency of, and useful as, butter, but of greater bulk and, consequently, less costly, than the butter, a quantity by weight of milk being far less costly than an equal or even a great deal smaller quantity by weight of butter.

The chief object of my present invention is then to provide a butter-merging machine especially adapted and designed for use in households where, for economy, it is desirable for certain purposes to increase the bulk of ordinary commercial butter, my new machine being of simple and inexpensive construction, efficient in operation with a minimum of effort, and readily cleaned and highly sanitary.

With the above and other objects in view, my present invention resides in certain novel features of form, construction, arrangement, and combination of parts, all as will hereinafter be described and afterward pointed out in the claims.

In the accompanying drawings,

Figure 1 is a vertical sectional elevation of a machine embodying my invention;

Fig. 2 is an elevational view of the machine taken at substantially a ninety degree angle relative to Fig. 1, the container being shown partly broken away and in section;

Fig. 3 is a sectional view taken approximately on the line 3—3, Fig. 1; and

Fig. 4 is a sectional view taken through the handle approximately on the line 4—4, Fig. 1.

Referring more particularly to the said drawings, in which like reference characters refer to like parts throughout the several views, 1 indicates the container for the butter and milk and which constitutes the body of my machine. By preference, the container 1 is in the form of a glass-jar having a reduced top or neck 2 externally threaded, as at 3.

Adapted to fit over and upon the neck 2 of the container 1, is a cap 4 provided preferably with threads, as at 3, for engagement with the container, whereby it may be firmly, yet easily, quickly, and conveniently, secured to, or removed from, the container 1.

Formed in the top of the cap 4, is a radial slot 6, which preferably extends at its outer end to a point adjacent the periphery of the cap. Through the slot 6, the shank of the butter-merger, now to be described, extends and operates.

The butter-merger proper comprises a dasher 7, a shank 8, a handle 9, a spring 10, and a base 11 forming means of attachment to the cap 4, all of which, in my preferred construction, are formed or constructed of a single piece of wire.

The base 11, which comprises one terminal or end of the wire, is doubled upon itself to produce two approximately parallel elements or strands 11', within whose lengths and between which is located the slot 6, the butter-merger proper being soldered or otherwise fixed at its base 11 to and upon the upper face of the cap 4. Preferably the bight of the base 11 is in registration with the outer end of the slot 6, as seen particularly in Fig. 3, whereby said base serves also as a reinforce for the slot against wear incident to the operation therein of the shank 8. From the end of one strand 11' of the base, the wire is bent upwardly to form a standard 12, which has at its upper end the spring 10 in the form of an integral coil, and from which the wire is extended at approximately a right angle to the standard and then doubled backwardly upon itself to form the handle 9. The so-formed doubled-strand handle 9 extends inwardly to a point above and over the approximate longitudinal center of the slot 6, the wire being then bent downwardly to provide the shank 8, which is extended in a straight line through the slot 6 and is of a length preferably to reach, or nearly reach, the bottom of the container 1 when the cap 4 is fitted or screwed in place thereupon. The dasher 7 is then formed by first bending the wire at the lower end of the shank at approximately a right angle to the trend of the shank and then back and forth across the shank, as seen particularly in Fig. 2, to form or provide a series of dasher-fingers, as I will call them, which fingers are relatively spaced vertically of the shank and arranged in a common plane substantially registering with the plane of the shank, the uppermost finger comprising the other terminal or end of the wire and being soldered or otherwise fixed to the shank, as also seen particularly in Fig. 2.

In use or operation, a quantity of butter and therewith a quantity of milk are placed in the container 1, and in this connection I may say that I have found it to be practicable to use equal parts by weight of the butter and milk and produce a butter and milk compound which is highly palatable and possessed of a consistency nearly that of the butter itself and wholly suitable for table and cooking purposes. The butter and milk being placed in the container and the cap 4 being secured thereupon, the operator grasps the handle 9 and moves it downwardly against the tension of the spring 10 and then relaxes pressure upon the handle to permit the handle, under the tension of spring 10, to return to normal or starting position, such action imparting reciprocal, back and forth motion to the dasher 7, whose fingers act on the butter and milk in an efficient manner to cause a merging of the two.

I am aware that minor changes in the form, construction, arrangement, and combination of the several parts of my new machine may be made and substituted for those herein shown and described without departing from the nature and principle of my invention.

Having thus described my invention, what I claim and desire to secure by Letters Patent is:

1. In combination with a slotted member adapted to be fitted upon a container, a dasher device including a standard mounted upon said member, a shank working in the slot of said member, and a handle for actuating the shank, the handle having engagement with the standard and stiff connection with the shank.

2. In combination with a slotted member adapted to be fitted upon a container, a dasher device including a standard mounted upon said member, a shank working in the slot of said member, a handle for the shank, and a coiled spring intermediate the handle and standard, the handle having stiff connection with the shank and being adapted to actuate the shank against the tension of the spring.

3. In combination with a slotted member adapted to be fitted upon a container, a dasher device including a standard mounted upon said member, a shank working in the slot of said member, a depressible handle for actuating the shank, and a coiled spring intermediate the handle and standard for yieldingly holding the handle and shank in normal position, the handle projecting approximately at right angles to, and having stiff connection with, the shank.

4. As a substantially unitary structure, a slotted member adapted to be fitted upon a container, and a dasher device, the dasher device including a standard upon said member and a shank working in the slot of, and reciprocably movable relatively to, said member.

5. As a substantially unitary structure, a slotted member adapted to be fitted upon a container, and a dasher device, the dasher device including a standard upon said member, a shank working in the slot of, and reciprocably movable relatively to, said member, a spring for holding the shank yieldingly in normal position, and a handle for actuating the shank against the tension of said spring.

6. A dasher for machines of the class described formed of a single strip of wire and including a standard whose base is adapted to be fixed to a supporting-member, a shank, and a series of spaced connected fingers disposed crosswise upon, and approximately at right angles to, the shank.

7. A dasher for machines of the class described formed of a single strip of wire and including a standard whose base is adapted to be fixed to a supporting-member, a shank, a shank-actuating spring and handle intermediate the standard and shank, and a series of spaced connected fingers disposed crosswise upon, and approximately at right angles to, the shank.

8. A dasher device for machines of the class described comprising a slotted member adapted to be fitted upon a container, and a dasher mounted upon said member, the dasher being formed of a single strip of wire and including a shank working in the slot of said member, and a spring and handle for actuating the shank.

9. A dasher device for machines of the class described comprising a slotted member adapted to be fitted upon a container, and a dasher formed of a single strip of wire and including a standard whose base is fixed to said member, a shank working in the slot of said member, and a spring and handle for actuating the shank, said spring and handle being intermediate the standard and shank.

10. In a dasher device for machines of the class described, the combination with a slotted member adapted to be fitted upon a container, of a dasher having a shank working in the slot of said member, a standard whose base is fixed to and upon said member, and a spring intermediate the standard and shank for yieldingly holding the shank in normal position.

11. In a dasher device for machines of the class described, the combination with a slotted member adapted to be fitted upon a container, of a dasher, and a standard for the dasher having its base fixed to and upon said member, said base surrounding the slot of said member and serving also as a reinforce therefor.

12. A machine of the class described comprising a container, a depressible handle upon the container, the handle having an up-and-down movement relatively to the container, and a dasher having stiff connection with the handle and working in the container, the dasher having a reciprocating movement back and forth in the container on up-and-down movement of the handle.

13. A machine of the class described comprising a container, a depressible handle upon the container, the handle having an up-and-down movement relatively to the container, a dasher having stiff connection with the handle and working in the container, the dasher having a reciprocating movement back and forth in the container on up-and-down movement of the handle, and means for yieldingly holding the handle and its connected dasher in normal position.

In testimony whereof, I have signed my name to this specification.

ROBERT N. EGGLESTON.

Copies of this patent may be obtained for five cents each, by addressing the "Commissioner of Patents, Washington, D. C."